United States Patent [19]

Keller et al.

[11] Patent Number: 4,517,593
[45] Date of Patent: May 14, 1985

[54] VIDEO MULTIPLEXER

[75] Inventors: Patrick N. Keller; Clinton D. Seal, both of Ridgecrest, Calif.

[73] Assignee: The United States of America as represented by the Secretary of the Navy, Washington, D.C.

[21] Appl. No.: 489,987

[22] Filed: Apr. 29, 1983

[51] Int. Cl.³ ............................................. H04N 7/18
[52] U.S. Cl. ..................................... 358/107; 358/87; 434/4
[58] Field of Search ................... 358/93, 108, 109, 87, 358/183, 107, 103, 104, 105; 364/460; 434/4; 250/222.1; 273/351, 371; 356/3, 4, 7, 8, 9

[56] References Cited

U.S. PATENT DOCUMENTS

| | | | |
|---|---|---|---|
| 3,207,842 | 9/1965 | Flagle | 178/6 |
| 3,603,729 | 9/1971 | Sperber | 358/105 |
| 3,736,377 | 5/1973 | Warren, Jr. | 178/7.2 |
| 3,743,768 | 7/1973 | Copland | 358/108 |
| 3,793,481 | 2/1974 | Ripley et al. | 358/107 |
| 3,811,010 | 5/1974 | Long | 358/107 |
| 4,051,524 | 9/1977 | Baxter | 358/108 |
| 4,139,860 | 2/1979 | Micic et al. | 358/22 |
| 4,157,572 | 6/1979 | Kennedy et al. | 360/33 |
| 4,257,066 | 3/1981 | Kaneko et al. | 358/183 |
| 4,266,242 | 5/1981 | McCoy | 358/22 |

Primary Examiner—Howard W. Britton
Assistant Examiner—Victor R. Kostak
Attorney, Agent, or Firm—Robert F. Beers; W. Thom Skeer; Kenneth G. Pritchard

[57] ABSTRACT

An event scoring apparatus using a video multiplexer and method are created by using a plurality of video cameras to cover limited fields of view of a given area. The cameras are distributed to cover the area. The video output of the cameras is used as input to a video multiplex circuit which multiplexes the camera video signals to form a composite signal containing the desirable information from each camera and generated the sync signal for the slave camera. By counting horizontal lines of video and video sync levels, selected lines of video are combined to form a composite video image. The composite video image permits both a target and a strike event to be recorded in at least two locations within the composite video. A scoring systems inputs the multiplexer output to determine the miss distance and direction from the target. A programmable read only memory permits one of the camera video inputs to be a gray level which is inserted between consecutive camera lines of actual real time video signal. These gray level stripes provide ease in identifying which horizontal lines are producing a given effect.

11 Claims, 8 Drawing Figures

VIDEO MULTIPLEXER

BACKGROUND OF THE INVENTION

1. Field of the Invention

The present invention is a video multiplexer. In particular, it is for a video multiplexer suitable for scoring systems of events, such as bomb scoring systems.

2. Description of the Prior Art

Previously video signals have been combined by a split screen technique where two or more separate images each share a portion of a composite video image. These composite images are created by selectively imposing portions of one image transmission raster on another transmission raster to provide for one master image. This is commonly seen in commercial television with video displays of people side by side who are separated by significant distances.

To superimpose a third raster in real time, a second machine is necessary to impose the third on the composition of the first two. Thus, each additional image requires additional apparatus to superimpose the next transmission raster. Each time such a combination occurs there is a loss of image quality. The initial two transmission rasters for several repetitions may lose the horizontal sync of the first rasters. If this occurs, the overall video image is lost.

CMOS and TTL are ways for identifying standard electrical components. CMOS stands for combination metallic oxide semiconductor and TTL stands for transistor-transistor logic. TTL and CMOS each have unique levels of voltage to drive those types of circuit components. Programmable read only memory, PROM, and erasable programmable read only memory, EPROM, are standard off the shelf memory devices. In choosing such memory devices, the desire is to have the amount of capacity necessary to do a given function. Standard CMOS components come in 4000 series which is an industry standard of notation and TTL devices come in standard 7400 series which is also a standard industry notation. This permits comparable components to be purchased from different manufactures.

SUMMARY OF THE INVENTION

A video multiplexer combines any number of stripes of individual video signals by slaving all other cameras to a master camera. The synchronization, sync, signals from the master are used to coordinate the horizontal and vertical alignment. The individual cameras are adjusted to provide a predetermined stripe of horizontal information which is combined with stripes of the other cameras. Limited vertical information is retained.

A scoring area is ideally monitored from two orthogonal angles by a plurality of cameras. Each camera for a given orientation covers a segment of the field-of-view. As a practical matter, any two intersecting lines of sigh greater than or equal to 30° will serve to triangulate an object's location. Angles less than 30° produce large uncertainties in exact location. By combining information from each of the two line of sight directions, triangulation of the target and the strike event locations are made. The cameras are aligned so a specific segment of their horizontal video contains the information for the field of view in question. Each camera output is used as input to the video multiplexer. The farthest camera is designated camera 1 or master camera and its standard synchronization signal, sync, is used to synchronize all remaining cameras to camera 1. They become slave cameras.

The multiplexer combines the horizontal stripes. As a result of this combination, a composite video circuit generates a standard video image composed of stripes of images from the various cameras used. One alternative permits a gray signal for a fixed camera located to be inserted between each of the actual cameras video. The composite video image is fed along a transmission circuit to a video recorder and a computer scoring system which provides for both the program monitor and a video monitor. The computer is tied to a scoring joystick which locates the strike event and target and permits the computer to do an automatic readout of the miss distance and direction for any given event.

DESCRIPTION OF THE PREFERRED EMBODIMENT

Figure 1:
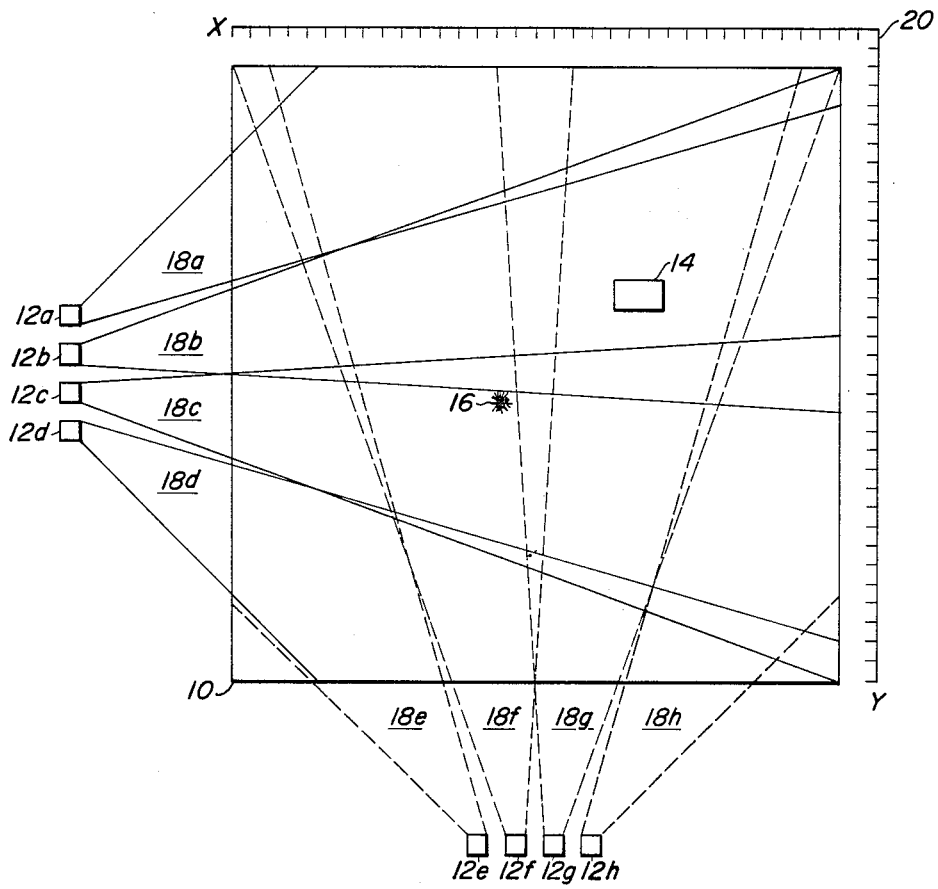
FIG. 1 is an overview of an area scored by the present invention.

FIG. 1 is an overview of an area 10 to be scored. A plurality of cameras 12a through 12h are arranged to cover area 10 from two different angles. For purposes of example, a total of eight cameras divided evenly between two lines of sight have been shown. However two cameras each covering the entire field-of-view from two different lines of sight may be used or any other number of multiple cameras with different perspectives. In the description that follows, camera 12a is assumed to be the farthest from the processing center and thus having the longest lead lines. For purposes of ease in discussion, camera 12a will also be referred to as camera 1. Within area 10 is a target 14, such as a tank, other vehicle, or building which is subject to attack. During attack, it is common for a target to be missed and not be subject to a direct hit. Such an event causes a strike point 16 to occur which is physically separated from target 14 by a defined distance and direction. Each camera has a specific field-of-view 18 which is represented by fields-of-view 18a through 18h which correspond to cameras 12a–12h. At least one camera from each line of sight have target 14 and have strike point 16 in their fields-of-view. Thus, it is possible to triangulate between the two cameras and determine the exact location and separation distance of target 14 and strike point 16 with reference to a master scoring grid 20. Scoring grid 20 does not have to be physically staked out on area 10 or around area 10. It is merely shown for clarity to represent an x-y plot of what is occurring in the placement of target 14 and strike point 16. To avoid dead spots in the field-of-view, it is possible for strike point 16 or target 14 to appear on more than two cameras. For example, a fields-of-view from cameras 12b and 12c might overlap and anything occurring in this overlap region appears on both cameras mounted on the y side of area 10.

Cameras 12a–12d are shown side by side as are cameras 12a–12h. Cameras for any given line of sight may either be stacked vertically or spaced further apart. What must be set is a defined field-of-view and an adjusted horizontal stripe of limited vertical size which views any event in the field of view. Advantage of adding more cameras to cover a given horizontal stripe is the greater detail provided. Each camera is able to use a larger magnification than a single camera covering everything.

Figure 2:
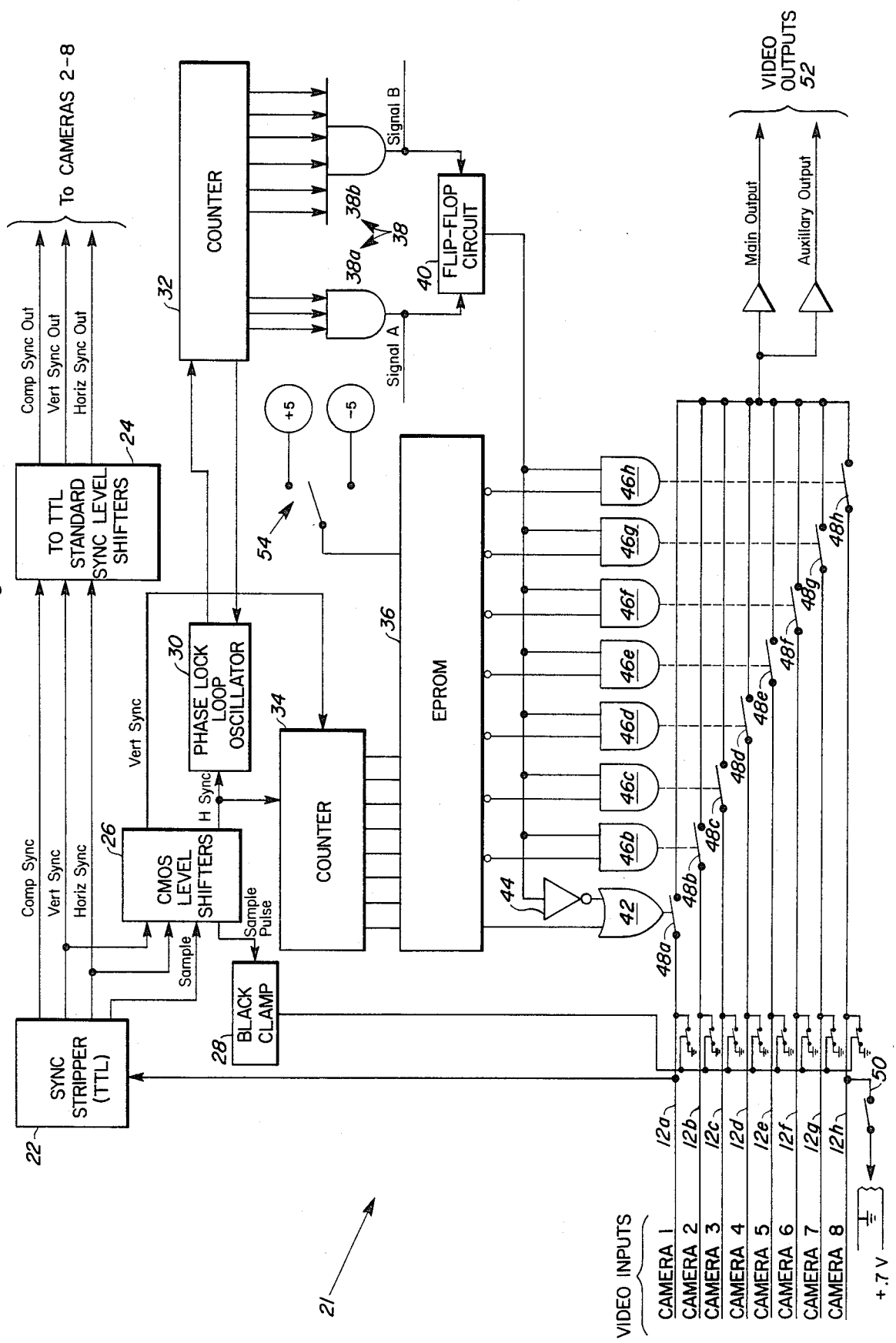
FIG. 2 is a signal flow block diagram of the present invention.

FIG. 2 is a signal flow diagram for a video multiplexer 21. The video output from the plurality of cameras, 12a through 12h, are received as video inputs to video multiplexer 21. The video input from camera 12a, camera 1, is fed to a sync stripper 22 designed for a transistor-transistor logic, TTL, standard voltage processing level for a video camera. The sync stripper divides the synchronization signals from camera 1 into horizontal sync, vertical sync and composite sync signals. The composite synchronization signal or composite sync is the combination of the vertical and horizontal signals. Sync stripper 22 also outputs a sample pulse signal. Thus, sync stripper 22 provides four separate outputs. The three sync outputs are fed to a TTL to standard synchronization level shifter 24. Standard sync level shifter 24 matches the TTL sync signals from camera 1 and feeds them to the remaining plurality of cameras, in this case cameras 12b through 12h or cameras 2–8. The horizontal sync signal and vertical sync signal from sync stripper 22 and the sample signal from camera 1 via sync stripper 22 are fed to a TTL to CMOS level shifter 26. CMOS stands for combination metallic oxide semiconductor. CMOS circuitry operates in a broader voltage range than TTL. Level shifter 26 feeds the sample circuit input to a black clamp 28 which clamps the input videos to ground, zero volts, during the normally grounded "front porch," which is explained further in the description. Thus, the difference in CMOS voltage output, for example either a +5 or −5 volts, and TTL voltage output, for example either a 0 or +5 volts, is to assure adequate video switching. The ten volt differential is related to ground and not allowed to drift on some static voltage above ground.

Level shifter 26 divides the video into an H sync signal, which represents the horizontal synchronization signal for each line of the video. The H sync is fed to a phase lock loop oscillator 30 which takes the standard H sync signal for the video input and oscillates at a fixed integral multiple of that signal. As an example, phase lock loop oscillator 30 may have a frequency of 32 times the frequency that horizontal lines are scanned across the video signal. Phase lock loop oscillator 30 is connected to a counter 32 which counts at this integral multiple with phase lock loop oscillator 30. Thus the H sync signal will be divided into 32 discrete bits which are counted by counter 32. Counter 32 cycles a fresh count each time a fresh H sync signal is received.

A second counter 34 is tied directly to the H sync signal from level shifter 26. Counter 34 also inputs a vertical sync signal from level shifter 26. Counter 34 counts the number of lines in the video format is presented. In general, a standard video format may be used but any number of lines in the video format can be accomodated. Counter 34 provides a track record of each horizontal line in a video picture. The vertical sync signal is used to reset counter 34 after it has completed an image scan and is to go back to the beginning and start scanning a fresh series of lines.

Counter 34 has output to a memory device such as an erasable programmable read only memor, EPROM. Thus counter 34 provides input to an EPROM 36. One example of a suitable EPROM is a 6654 CMOS PROM which is an industry standard code. EPROM 36 fits into a zero insertion force socket on a main circuit board, not shown. By providing a large enough capability, EPROM 36 contains the code for two split formats of patterns. EPROM 36 is switched between these two patterns by a split mode select switch 54. As an example, EPROM 36 may be preset to handle video from eight cameras or from two cameras depending upon the position of split mode select switch 54. Alternatively, EPROM 36 can be programmed to provide different line patterns for eight cameras. For example, camera eight may be modified to insert a gray level and have a small number of horizontal lines between cameras 1 and 2 and 2 and 3 filled by lines from the camera 8 gray level which forms a border or separation line between each of the remaining cameras. As many patterns as desired, are made by simply programming ERPOM 36 in the desired readout format.

Counter 32 which is counting the integral multiple of the H sync signal, for purposes of example 32, uses two AND gates as decode gates 38. Assume that the normal H sync signal is comprised within the first five counts of phase lock loop oscillator 30 which counts thirty-two times per horizontal line. The actual video signal will be covered in the remaining period between count 5 and count 31 of counter 32. When counter 32 counts to 5, the "5" decoder sets a flip-flop circuit 40. When counter 32 counts to 31, the "31" decoder resets flip-flop circuit 40. The signal from flip-flop circuit 40 is fed to a plurality of AND gates 46b and through an inverter 44 to a NOR gate 42. During counter 32's counting from 0 to 31, which occurs during each horizontal line, flip-flop circuit 40 is set from count 5 to count 30, then reset on count 31 and stays reset until count 5 comes again. The output of flip-flop circuit 40 is therefore a window in time, starting a little ahead of normal H sync and ending a little after H sync. During this window, flip-flop circuit 40 enables a NOR gate 42 to allow only video from camera 1 to pass to output and inhibits all the others. Outside this window, flip-flop circuit 40 enables all other cameras and thereby gives control to EPROM 36. This scheme assures that the output video will always contain horizontal sync from camera 1. If the time for the H sync signal from camera 1 has passed, counter 32 produces its signal from 31 decode AND gate 38b and produces an output signal B which resets flip-flop circuitry 40. Each of NOR gates 42 and AND gates 46b–46h are also tied to EPROM 36.

If flip-flop circuit 40 wishes to invoke camera 1 video, it comes through an inverter to NOR gate 42 and based on the signal from EPROM 36 closes a switch 48a which permits video from camera 1 to pass through switch 48a. AND gates 46b–46h are tied to switches 48b–48h which are respectively tied to cameras 12b–12h. Switches 48a–48h may be analog switches. The result of using switches 48a–48h is that the appropriate signal from both EPROM 36 and flip-flop 40 is required to close a single circuit for a given camera.

When any one of switches 48a–48h is closed, all other switches are in the open position. Because camera 1 is used to sync the start of a horizontal line, there is no AND gate 46a. Rather, a NOR gate 42 fed by inverter 44 will close switch 48a briefly at the start of each line to permit the H sync pulse to pass through to align the video. If EPROM 36 desires all of the line to be camera 1 video, switch 48a will remain closed and the necessary closing signal from EPROM 36 to AMD gates 46b–46h is not present, causing the entire line to be video from camera 1. If the video is desired from a different camera, the signal from EPROM 36 is an enabling signal to an AND gate, such as 46b, and EPROM 36 will not be producing any signal to NOR gate 42 that permits switch 48a to close. EPROM 36 also does not provide the necessary signal to AND gates 46c–46h to permit them to close. The signal from flip-flop circuit 40, if coded to the H sync period at the beginning of a horizontal line, is inverted to permit NOR gate 42 to receive a signal necessary to close switch 48a while AND gate 46b will not see the second necessary enabling signal from flip-flop circuit 40 and switch 48b will remain open. Upon the five counts necessary in counter 32 to permit the H sync pulse to be aligned, flip-flop circuit 40 gets "set" and puts out a positive signal to each of AND gates 46b–46h. This positive signal is also passed through inverter 44 which inverts the signal and produces an appropriate "no" signal in NOR gate 42 to prevent switch 48a from closing. Since EPROM 36 is only permitting a necessary matching signal to AND gate 46b, switch 48b is the only one closed. This cycle repeats itself for each horizontal line of video with EPROM 36 determining which cameras' video is allowed to pass, and flip-flop circuit 40 determining when camera 1's video sync is allowed to pass.

Figure 5:
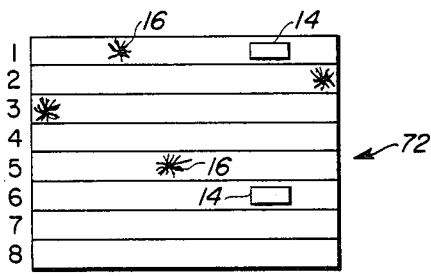
FIG. 5 is a sample of the composite video output for the present invention.

The horizontal lines are processed through a composite video output circuit which provides a striped array of video as shown by FIG. 5. In FIG. 5, eight separate blocks of horizontal lines create a composite video signal 72. Within the first four blocks of lines, target 14 and strike point 16 are shown. Within the last four blocks of lines, target 14 and strike points 16 are also shown. These points are referred back to FIG. 1 for the representation of the actual area 10 where the event is to occur.

Figure 3:
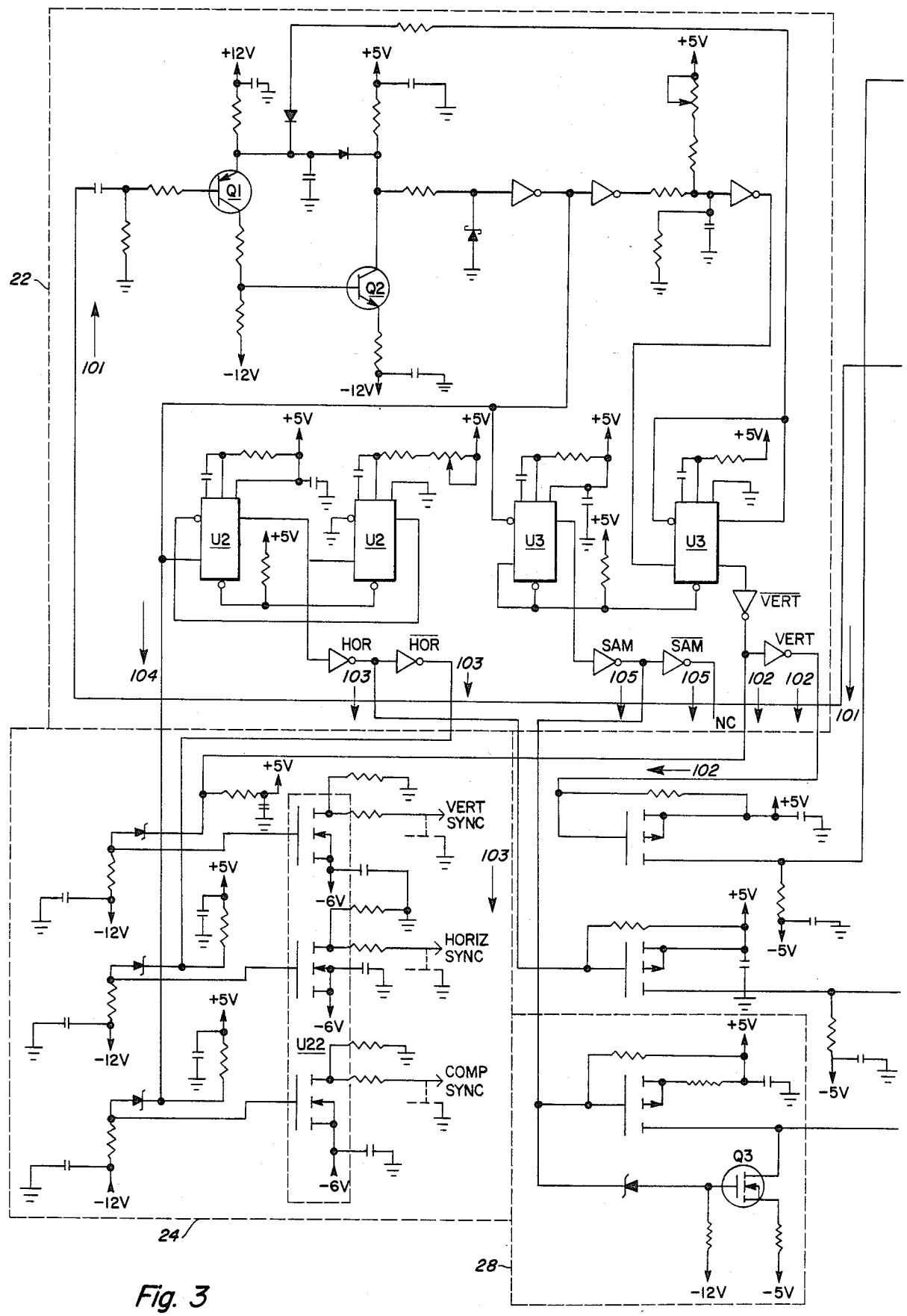
FIG. 3 is a circuit diagram of most of the blocks of FIG. 2.
Figure 3:
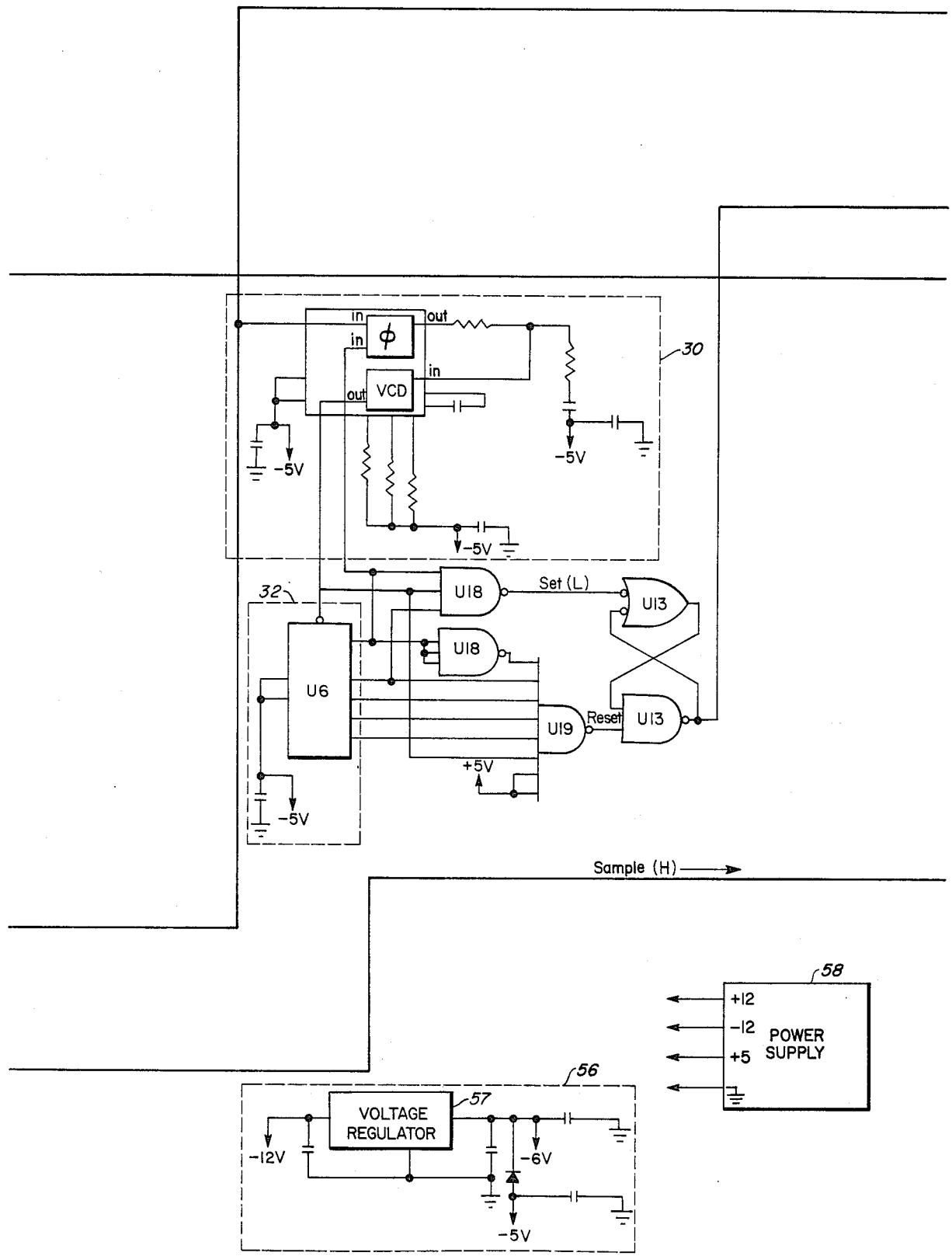
Figure 3:
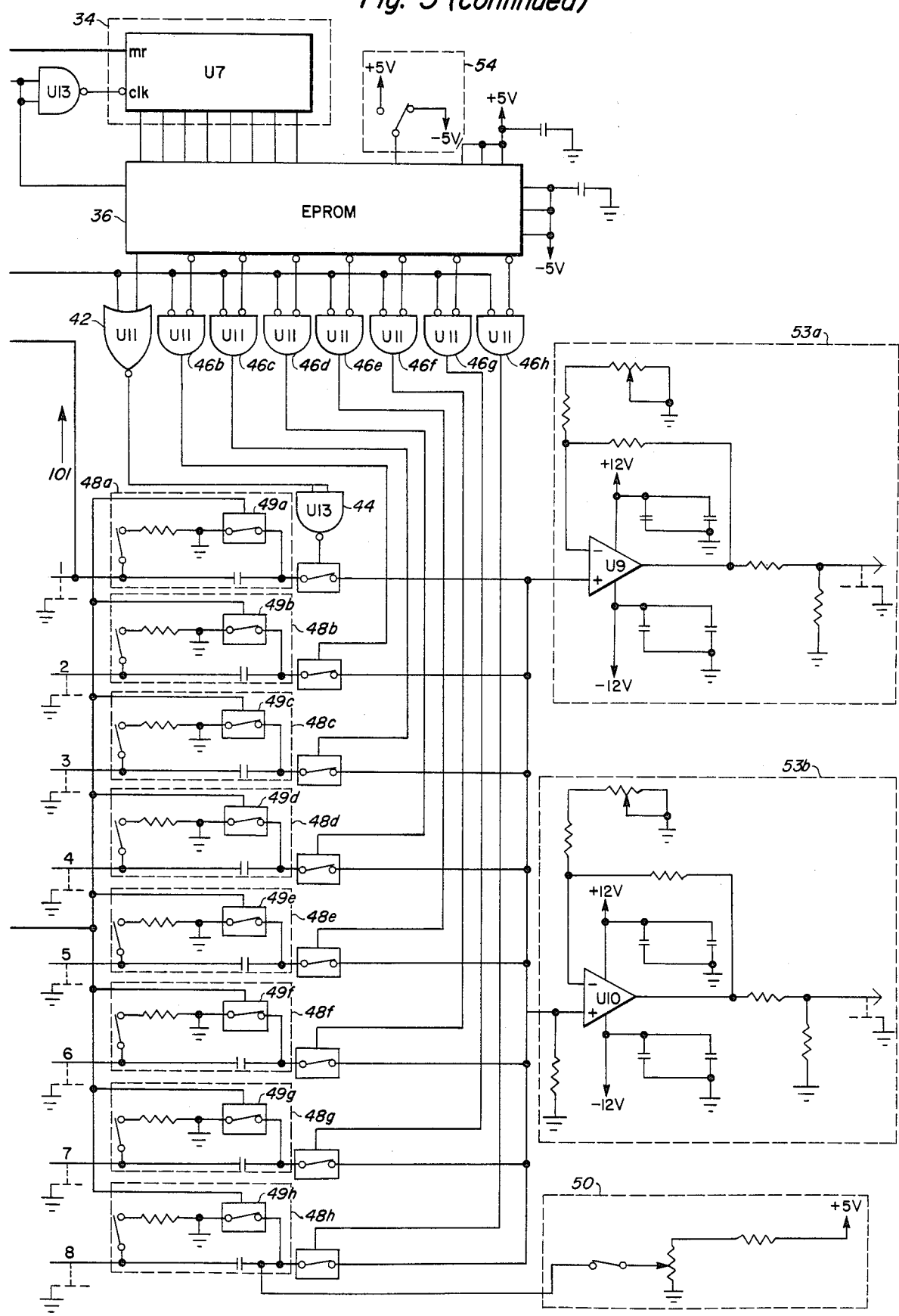

FIG. 3 is a circuit diagram for most of the blocks shown in FIG. 2. The video signal enters along the inputs shown as 1-8. Camera 1, which is referenced as number 1, has its signal directed to sync stripper 22 per arrow 101 which extracts from the comp sync, the horizontal sync and vertical sync via transistors $Q_1$ and $Q_2$. The circuitry shows five voltage levels, either +5, +12, −5, −6, or −12. A DC power supply 58 provides a ground base, a +5 voltage, and a +12 and −12 volt supply. A power supply 56 uses the −12 volt input from DC power supply 58 and passes it through a voltage regulator 57 to create both a −6 volt supply and −5 volt supply. The −5 volt supply is fed to all CMOS components and is tied to whatever arrows are marked −5 V. Similarly, other arrows marked −12 V or −6 V are tied to the appropriate points of the power supply. The specific capacitances and resistances have been omitted as a matter of design circuitry. The signals fed from sync stripper 22 to sync level shifter 24 show the transistion and cycling necessary to produce the vertical sync 102, horizontal sync 103 and comp sync 104 shown as outputs. The items marked Q1 refer to PNP transistors such as 2N3906. The Q2 transistors represent NPN2N3904 and Q3 transistors represent FET transistors VN0104. FET refers to field effect transistors. These are standard transistor types and are not meant to exclude other possible transistors from working in these locations. They do represent examples of transistors which may be used and have the circuit balanced around them as shown. In general, the TTL logic will show either a 0 or +5 volt output while CMOS circuitry will show either a −5 or a +5 volt. CMOS components are graded according to a 4XXX series and TTL components are marked according to a 74XX series. Items marked U1 refer to 74LS14 while, U2 and U3 refere to 74LS123 TTL devices whereas U22 in sync level shifter 24 refers to a device similar to VN0104. Items U1 are Schottky inverters. As shown, black clamp 28 is a subcircuit wired within level shifter 26.

Black clamp 28 inputs the sample signal 105 from sync stripper 22. The difference between sample and $\overline{sample}$ is that one signal is the inverse of the other. Thus $\overline{VERT}$ is the inverse signal of VERT. Black clamp 28 feeds the sample signal to switches 49a–49h which are part of switching circuits 48a–48h. When the sample signal reaches switches 49a–49h, it grounds all video to clear the circuitry of any residual information or DC shift at a specific time. Each switch 49 may be CMOS 4066. After the sample signal, switches 49a–49h automatically open permitting standard video operation.

Counter 34 may be a 4040 CMOS device as represented by U7. NOR gate 42 and AND gates 46b–46h may be made with components such as CMOS 4001 devices, their similarity is marked by U11. Counter 32 may be a 4024 CMOS device, gates U18 may be a 4023, gates U13 may be 4011 and U19 may be a 4068 device. The gray level circuit 50 is shown connected to the last camera video input, referenced as input 8, and provides the options for switching out the video input from camera 8. Inserted is a uniform gray level to produce a composite video picture as described further on. The composite video output circuit is divided into a main output 53a and auxiliary output 53b as shown.

Figure 4:
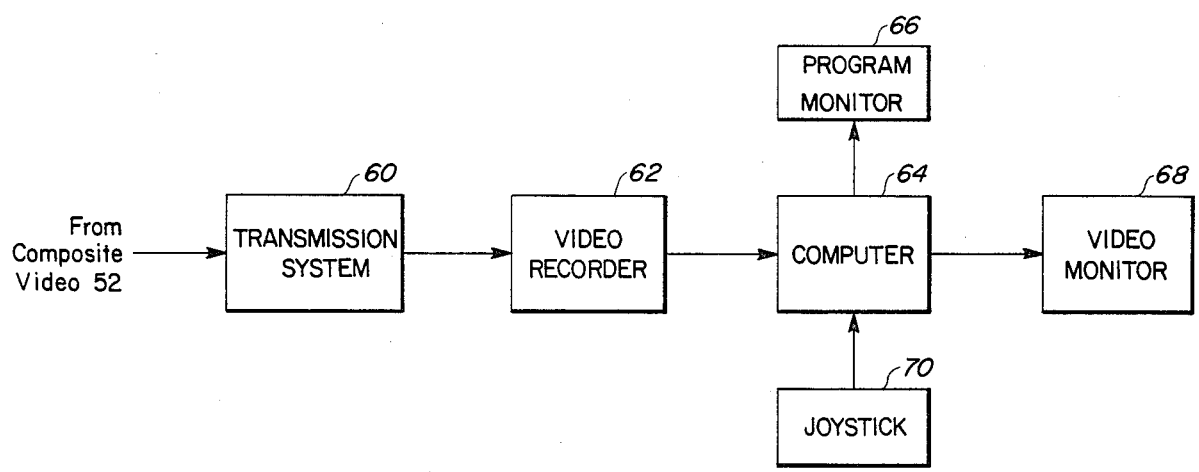
FIG. 4 is a block diagram of a scoring circuit for the present invention.

FIG. 4 shows a block diagram adding a storing circuit portion to the present invention to use the video multiplexer as a scoring system. The signal from composite video 52 is fed through a transmission system 60 to a video recorder 62. Video recorder 62 is either disc or tape which may have a freeze feature for extended viewing of bomb flash or whatever scoring event occurs at the strike point. Video recorder 62 is in turn connected to a computer 64, such as a Northstar computer, which inserts a crosshair and performs calculations on miss distance and heading. Tied to computer 64 is a program monitor 66 which monitors the controlling programming, video monitor 68 which provides for the split and cursor and crosshair control on the overall master video image, and a control or joy stick 70 which permits a viewer to place the crosshairs over either the target or the strike point and signal them the marking points for the computer to permit the computer to perform the calculations desired.

Figure 7:
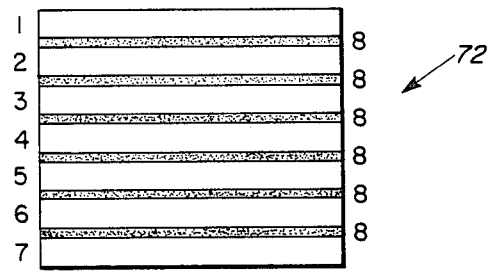
FIG. 7 is a alternate composite video output for the present invention.

If a gray signal is desired, FIG. 5 can be modified to look like FIG. 7. In FIG. 7 the composite video image 72 only uses seven cameras versus the eight of FIG. 5 to produce its line images. In place of video input from the eighth camera, camera eight has a gray level signal inserted which is reference for a very few lines between the remaining video images. Thus camera eight represents the shaded stripe between cameras 1-7 as shown.

Figure 6:
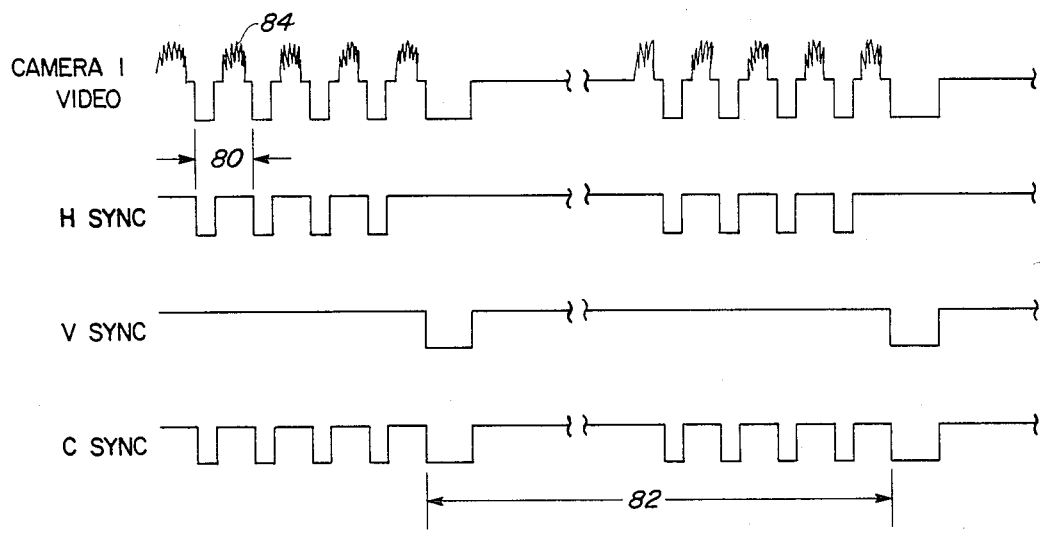
FIG. 6 is a graph of the timing relationships of the various synchronization signals used in the present invention.

FIG. 6 shows representative timing signals and video signals that are the total video signal. In a standard video signal, there are 262.5 H sync pulses 80 between each V sync pulse 82. The composite sync, C sync, has both H sync and V sync with the video signal 84. Thus, 262.5 different horizontal lines are received before V sync starts a fresh image to be scanned.

Figure 8:
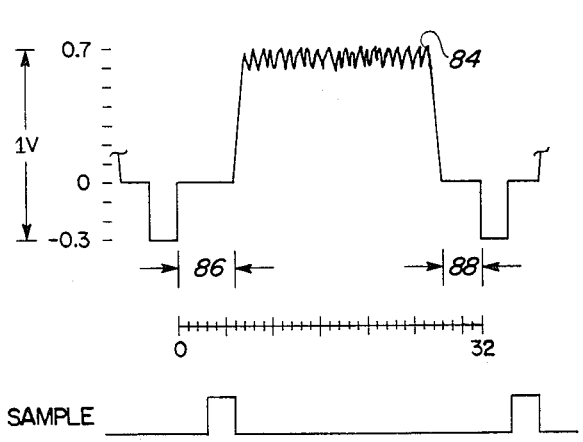
FIG. 8 is a timing diagram of a single horizontal video line.

FIG. 8 is a single video line signal 84. The thirty two dashes refer to the integrel multiple provided by phase lock loop oscillator 30 of FIG. 3. At counts 1 through 5, 5 decode AND gate 38a receives the signal from counter 32. Length 86 between H sync and the rise of the video signal 84 is known as the front porch. Length 88 is known as the back porch. By making the H sync signal negative it is easy to identify and strip from the total video signal.

It is obvious to those skilled in the art modifications to the above system may be made.

What is claimed is:

1. A video multiplexer scoring system apparatus for scoring an event area comprising:
    a plurality of cameras placed around the event area, such that it is viewed from at least two perpsectives, each of said cameras providing a standard video output including synchronization signals of a predetermined section of said event area;
    means for synchronizing said plurality of camera's video output to provide a pattern of horizontal stripes, where said means for synchronizing comprises:
    a synchronization, sync, stripper circuit electrically connected to the video output of one of said plurality of cameras, said camera titled camera 1, said sync stripper circuit outputting vertical, horizontal, and composite synchronization signals;
    a synchronization level shifter circuit connected to said sync stripper circuit output and to the remainder of said plurality of cameras such that said remainder of the plurality of cameras are synchronized, slaved, to camera 1;
    a level shifter connected to said sync stripper output to increase the voltage range of the video output of camera 1, said level shifter outputting a vertical synchronization signal, a sample signal, and a horizontal synchronization signal;
    a black clamp circuit connected to said sample signal output from said level shifter to ground the input signals of said video cameras;
    a phase locked loop oscillator connected to the horizontal synchronization signal output of said level shifter, said phase locked loop oscillator synchronized to an integral multiple of the horizontal sync frequency of camera 1;
    a first counter connected to said phase locked loop oscillator which cycles through said integral multple of the horizontal sync frequency of camera 1;
    a second counter inputting said vertical and horizontal sync outputs of said level shifter to count the horizontal lines of said standard video signal and to reset said horizontal line counter after each vertical sync signal;
    a programmable read only memory, PROM, connected to said second counter, said PROM programmed to select specific horizontal lines counted by said second counter and match those lines to a preselected pattern of said plurality of cameras;
    a plurality of switches connected between said PROM and said plurality of cameras such that each switch is matched to a specific camera video input;
    a flip-flop circuit connected between said first counter and said plurality of switches such that said switches are opened or closed for a preselected count in said first counter;
    a composite video output circuit connected to said plurality of switches such that a given horizontal line of video signal is from only one of said plurality of cameras;
    means for recording said composite video output connected to said composite video output circuit; and
    means for scoring events that appear in said composite video output;
    means for recording the occurrence of an event within said area by connecting said recording means to said synchronizing means, such that said pattern of horizontal stripes is recorded; and
    means for locating said event within said area by triangulating said recorded synchronized horizontal stripes, said locating means connected to said recording means.

2. A video multiplexer scoring system apparatus for scoring an event area as described in claim 1 where said flip-flop circuit further comprises two AND gates connected to said first counter to match specific counts of said integral multiple of said horizontal sync with one of said flip-flops output signals.

3. A video multiplexer scoring system apparatus for scoring an event area as described in claim 1 where said means for synchronizing further comprises a split mode select circuit connected to said PROM to change the number of cameras video input used to create said composite video output.

4. A video multiplexer scoring system apparatus for scoring an event as described in claim 1 further comprising a fixed gray level signal as a video input from one of said plurality of cameras.

5. A video multiplexer scoring system apparatus for scoring an event area as described in claim 3 further comprising a fixed gray level signal as a video input from one of said plurality of cameras.

6. A video multiplexer scoring system apparatus for scoring an event areas as described in claim 1 where said PROM comprises an erasable PROM, EPROM.

7. A video multiplexer scoring system apparatus for scoring an event area as described in claim 1 where said plurality of switches further comprise:
    a NOR gate between said PROM and camera 1 video input;
    a plurality of AND gates, one each between said PROM and each video input from the rest of said plurality of cameras; and
    an inverter between said NOR gate and said flip-flop circuit.

8. A video multiplexer scoring system apparatus for scoring an event area as described in claim 7 where said flip-flop circuit further comprises two AND gates connected to said first counter to match specific counts of said integral multiple of said horizontal sync with one of said flip-flops output signals.

9. A video multiplexer scoring system apparatus for scoring an event area as described in claim 8 where said means for synchronizing further comprises a split mode select circuit connected to said PROM to change the number of cameras video input used to create said composite video output.

10. A video multiplexer apparatus for scoring an event area as described in claim 9 further comprising a fixed gray level signal as a video input from one of said plurality of cameras.

11. A video multiplexer for combining a plurality of video inputs from a plurality of cameras as horizontal stripes comprising:

- a synchronization, sync, stripper circuit electrically connected to the video output of one of said plurality of cameras, said camera titled camera 1, said sync stripper circuit outputting vertical, horizontal, and composite synchronization signals;
- a synchronization level shifter circuit connected to said sync stripper circuit output and to the remainder of said plurality of cameras such that said remainder of the plurality of cameras are synchronized, slaved, to camera 1;
- a level shifter connected to said sync stripper output to increase the voltage range of the video output of camera 1, said level shifter outputting a vertical synchronization signal, a sample signal, and a horizontal synchronization signal;
- a black clamp circuit connected to said sample signal output from said level shifter to ground the input signals of said video cameras;
- a phase locked loop oscillator connected to the horizontal synchronization signal output of said level shifter, said phase locked loop oscillator synchronized to an integral multiple of the horizontal sync frequency of camera 1;
- a first counter connected to said phase locked loop oscillator which cycles through said integral multiple of the horizontal sync frequency of camera 1;
- a second counter inputting said vertical and horizontal sync outputs of said level shifter to count the horizontal lines of said standard video signal and to reset said horizontal line counter after each vertical sync signal;
- a programmable read only memory, PROM, connected to said second counter, said PROM programmed to select specific horizontal lines counted by said second counter and match those lines to a preselected pattern of said plurality of cameras;
- a plurality of switches connected between said PROM and said plurality of cameras such that each switch is matched to a specific camera video input;
- a flip-flop circuit connected between said first counter and said plurality of switches such that said switches are opened or closed for a preselected count in said first counter;
- a composite video output circuit connected to said plurality of switches such that a given horizontal line of video signal is from only one of said plurality of cameras;
- means for recording said composite video output connected to said composite video output circuit; and
- means for scoring events that appear in said composite video output.

* * * * *